United States Patent Office 3,454,358
Patented July 8, 1969

3,454,358
METHOD FOR PREPARING PURE,
STABLE ZnSe POWDER
Donald Walther Roy, Rochester, N.Y., assignor to Eastman Kodak Company, Rochester, N.Y., a corporation of New Jersey
No Drawing. Continuation-in-part of application Ser. No. 132,990, Aug. 21, 1961. This application Dec. 23, 1965, Ser. No. 516,098
Int. Cl. C01g 9/00; C01b 19/00
U.S. Cl. 23—50                                                     6 Claims

ABSTRACT OF THE DISCLOSURE

Brown commercial zinc selenide powder is heated in a non-oxidizing atmosphere at a temperature between 1400 and 2300° F. to improve its characteristics for the hot pressing of infrared transparent optical elements therefrom. A preliminary heating at a superatmospheric temperature up to 600° F. is advantageous.

The resulting zinc selenide powder has a lemon yellow color, has a density between 1.8 and 2.3 grams/cc., and is substantially all of cubic structure, whereas the starting powder was principally hexagonal.

---

This application is a continuation-in-part of application Ser. No. 132,990 filed Aug. 21, 1961 and now abandoned, by Donald W. Roy and William F. Parsons.

The present invention relates to a novel method for preparing zinc selenide powder of greater purity, density and stability than has been available heretofore commercially; and to the resulting product.

Zinc selenide is useful for polycrystalline windows or lenses employed in applications depending upon the transmittance of infrared rays, and such windows have been prepared by hot pressing by the general process steps described for zinc sulfide in U.S. Patent 3,131,238, dated Apr. 28, 1964, and as also described for zinc selenide in pending U.S. patent application Ser. No. 132,990 in the name of the present inventor and William F. Parsons.

Such zinc selenide polycrystalline windows are good infrared transmitters, but when pressed from commercial powder there is discoloration in the hot pressed polycrystalline window which suppresses infrared transmittance, particularly in the range between 0.6 and 22 microns. Also, instability of the commercial powder during hot pressing sometimes results in spontaneous decomposition. While the causes of these problems are not known with certainty, it is postulated that they occur because commercially available zinc selenide powders contain around 0.1% of water vapor and possibly other adsorbed gases, as well as residual free metallic zinc and selenium resulting from the compound preparation. The greater the amount of impurities, the greater is the discoloration. This is particularly noticeable when pressings are greater than 1 inch in diameter. The small size of the zinc selenide crystals and the agglomerates in commercial powder also is a factor in the inability to use this powder for large transparent pressings such as discs 7 inches in diameter.

In accordance with the present invention, the problems described above have been solved by heating commercial zinc selenide powder, which has a light brown color, in a container at a high temperature for a period of time sufficient to develop a lemon yellow color, probably as the result of eliminating the water vapor and the metallic zinc and selenium impurities. A temperature within the range of 1400 to 2300° F. is effective. It is essential that the heating be accomplished in a non-oxidizing atmosphere to prevent undesirable decomposition or oxidation of the powder.

Best results are obtained by a preliminary heating of commercial zinc selenide powder at a relatively low temperature, such as 500 to 600° F., to eliminate the water vapor completely, followed by raising the temperature to the relatively high primary heating range.

During both the preliminary soaking period and the primary high temperature heating period a non-oxidizing atmosphere is assured either by maintaining a vacuum in the heating zone or by introducing a continuous flow of a non-oxidizing gas, such as nitrogen, argon, or hydrogen, into the heating zone throughout the heating period.

Upon completion of heat treatment, the temperature is gradually reduced until the furnace reaches a temperature of about 350° F., after which the lemon yellow improved zinc selenide powder is removed and can be used for pressings.

EXAMPLE I

Commercial light brown zinc selenide powder was placed in a quartz tube 4 feet long and 4 inches in diameter, having an open end and a closed end, and introduced into an electric furnace. After closing the open end, exhausting all gases from the tube, and drawing a vacuum of 10 microns, the tube and contents were heated slowly to a temperature of 500° F. and held at this temperature for one-half hour, after which the temperature was raised to 575° F. and held for one hour. During this one and one-half hour preliminary soaking period gas was evolved rapidly from the powder.

The temperature was then raised to 1850° F. and held for one hour, after which the electricity was shut off and the furnace allowed to cool to 350° F. before removing the zinc selenide powder.

The treated zinc selenide powder was lemon yellow as opposed to the brown color of the starting material, and both the basic crystal size and the size of powder agglomerates were greater than in the starting powder. When used for the pressing of optical windows, an improved window was secured having a clearer, more yellow appearance than windows prepared from the commercial zinc selenide powder which were black and opaque over the major portion of their areas. Infrared transmittance in the region from 0.6 to 22 microns through a ¼-inch thick window was increased by a factor of 100% compared to a black opaque window prepared from the impure commercial powder.

EXAMPLE II

Commercial zinc selenide powder was placed in the furnace in an open container, and a stream of argon flowed into and out of the furnace at a rate of 4 c.f.h., while the furnace and its contents were heated to 560° F. and held at that temperature for one hour. The temperature then was raised to a primary temperature of 1500° F. and held at that value for one hour before cooling to 350° F., while maintaining a flow of argon continuously.

The product and a window pressed therefrom were improved to the same extent described in Example I.

EXAMPLE III

Commercial zinc selenide powder was heated in an argon atmosphere as in Example II, but using a primary heating temperature of 2200° F. for one hour.

The product was improved to the same extent.

EXAMPLE IV

Commercial zinc selenide powder was similarly purified and stabilized in an atmosphere of nitrogen by a preliminary soak at 560° F. for one hour, followed by heating at 2200° F. for one hour, while maintaining a continuous flow of nitrogen through the furnace.

EXAMPLE V

Commercial zinc selenide powder was purified and stabilized with a preliminary soak at 560° F., followed by heating at 1600° F. for 5½ hours in an atmosphere of gaseous hydrogen flowing continuously through the furnace.

The preliminary soak at a temperature between 500 and 600° F. has been found to be particularly advantageous because of its rapidity, but lower temperatures down to about 300° F. also are effective, although the heating time must be longer, as up to 5 hours.

During the process described above the powder is improved as to color and stability, probably due to the reremoval of volatile impurities such as water vapor, free selenium, and zinc. Furthermore, stability of the product is improved because the heated powder undergoes densification, and densification diminishes the possibility of spontaneous decomposition, thus making the powder more amenable to hot pressing. Commercial powders having densities of 0.9–1.2 grams/cc. were densified to 1.8–2.3 grams/cc.

X-ray diffraction analyses have shown that baked zinc selenide powder was substantially all of cubic structure, whereas the unbaked powder was principally hexagonal. Visual estimation of the lines' widths in the diffraction patterns also showed that the average crystal size in the unbaked powder was less than 100 A., whereas in the baked powder the average crystal size was greater than 1000 A.

Bound nitrogen content of unbaked samples (residue from the hydrazine used in the manufacturing process) was approximately 2%, whereas in baked samples the nitrogen content was less than 0.1% (0.07 and 0.04% in two samples).

The powder was principally made up of agglomerates of individual crystals, the percent of unagglomerated crystals being very small. In unbaked powder the size of the agglomerates averaged approximately 0.0008 inch, as against about 0.002 inch in baked powder.

The invention has been described in considerable detail with particular reference to certain preferred embodiments thereof, but it will be understood that variations and modifications can be effected within the spirit and scope of the invention as described hereinabove, and as defined in the appended claims.

I claim:

1. In the process of producing polycrystalline zinc selenide by hot pressing unstable brown commercial zinc selenide powder whereby discolored articles of reduced infrared transmittance are formed the improvement comprising treating said commercial powder prior to hot pressing to improve its characteristics for hot pressing windows therefrom comprising introducing a mass of such brown commercial zinc selenide powder into a container, heating such powder in a non-oxidizing atmosphere at a temperature between 1400 and 2300° F. for a time sufficient to develop a lemon yellow color, thereafter gradually reducing the temperature to about 350° F., and thereafter recovering an improved zinc selenide for hot pressing.

2. A process in accordance with claim 1 wherein said non-oxidizing atmosphere is secured by maintaining a vacuum while heating said powder.

3. A process in accordance with claim 1 wherein said non-oxidizing atmosphere is secured by maintaining a blanket of gaseous nitrogen over said powder.

4. A process in accordance with claim 1 wherein said non-oxidizing atmosphere is secured by maintaining a blanket of gaseous argon over said powder.

5. A process in accordance with claim 1 wherein said non-oxidizing atmosphere is secured by maintaining a blanket of gaseous hydrogen over said powder.

6. A process in accordance with claim 1 also comprising preceding said heating by maintaining said powder at a lower superatmospheric temperature up to 600° F.

References Cited
UNITED STATES PATENTS

| | | | |
|---|---|---|---|
| 2,021,990 | 11/1935 | Depew | 34—15 X |
| 2,444,832 | 7/1948 | Krebs | 34—15 X |
| 2,767,049 | 10/1956 | Nitsche | 23—50 |
| 2,929,678 | 3/1960 | Zalm | 23—50 |

HERBERT T. CARTER, *Primary Examiner.*

U.S. Cl. X.R.

23—293; 34—15; 263—52